United States Patent [19]
Norman

[11] Patent Number: 5,087,796
[45] Date of Patent: Feb. 11, 1992

[54] ELECTRICAL OUTLET SAFETY COVER

[76] Inventor: Victor R. Norman, 5730 E. Bloomfield, Simi Valley, Calif. 93063

[21] Appl. No.: 511,089

[22] Filed: Apr. 19, 1990

[51] Int. Cl.$^5$ ............................................. H02G 3/18
[52] U.S. Cl. ....................................................... 174/67
[58] Field of Search .................... 174/67; 220/242; 439/135, 147

[56] References Cited

U.S. PATENT DOCUMENTS

| | | | |
|---|---|---|---|
| 2,510,745 | 6/1950 | Kilgore | 174/67 |
| 4,070,078 | 1/1978 | Chrones | 439/142 |
| 4,424,407 | 1/1984 | Barbic | 174/67 |
| 4,603,932 | 8/1986 | Heverly | 439/147 |
| 4,605,817 | 8/1986 | Lopez | 174/67 |
| 4,618,200 | 10/1986 | Roberts | 439/147 X |
| 4,803,307 | 2/1989 | Shotey | 174/67 |

Primary Examiner—Gerald P. Tolin
Assistant Examiner—David A. Tone

[57] ABSTRACT

An outlet safety cover that encloses electrical sockets (58) and keeps small children from pulling plugs (56) out of sockets (58) or inserting objects into sockets (58). The outlet safety cover includes a housing (10) and flexible clip (34) which interlocks with housing (10) to securely hold housing (10) against electrical outlet faceplate (54). The housing (10) can be installed and removed quickly without the use of a tool, by means of a flexible clip (34) that is attached to existing electrical outlet assembly with a screw (60). The housing (10) is installed by simply pushing housing (10) onto flexible clip (34). To remove housing (10), adults need to simply apply finger pressure to tabs (36) until housing (10) disengages with flexible clip (34).

4 Claims, 4 Drawing Sheets

ELECTRICAL OUTLET SAFETY COVER

BACKGROUND OF THE INVENTION

1. Field of the Invention

This invention relates to protective housings for standard household electrical outlet receptacles, specifically to protective housings that reduce possibility of electrical shock to small children. More specifically to protective housings which function as a retainer for electrical plug when electrical outlet is in use and electrical outlet cover when electrical outlet is not in use.

2. Description of the Prior Art

Protecting infants and small children from hazards associated with household electrical outlet receptacles has been and continues to be a problem for many parents. Attempts have been made to solve this problem by providing a device to function as a retainer for electrical plug when outlet is in use and outlet cover when outlet is not in use. However, these past devices fail to provide the necessity of convenience for the user. Examples of such inconveniences are as follows:

Lopez U.S. Pat. No. 4,605,817, Barbic, U.S. Pat. No. 4,424,407, each show an electrical outlet safety cover that requires a tool to remove and replace the outlet safety cover when an electrical plug is connected or disconnected from an outlet.

Chrones, U.S. Pat. No. 4,070,078, shows an outlet safety cover that requires the user to remove and discard existing electrical receptacle faceplate in order to install device.

Heverly, U.S. Pat. No. 4,603,932, shows an outlet safety cover that is difficult to remove and replace when an electrical plug is connected or disconnected from an outlet.

Thus, the prior art fails to disclose an outlet safety cover that is convenient to assemble and convenient to remove and replace when required.

SUMMARY OF THE INVENTION

Accordingly, it is an object of this invention to provide a safety cover that helps prevent access by small children to common household electrical outlet receptacles whether or not any electrical plugs are inserted therein.

It is a further object to provide an outlet safety cover which can be used with either two-prong or three-prong electrical outlet receptacles.

It is a further object to provide an outlet safety cover which can be readily applied to an existing outlet receptacle faceplate by a homeowner and requiring no contact with the electrical connections of the outlet.

It is a further object to provide an outlet safety cover that will be easily operated, without the use of a tool, by adults but not by small children.

It is still a further object to provide an outlet safety cover which is simple in construction and which can be manufactured and sold at a price which will make it available to all without undue financial outlay.

Further objects and advantages of the present invention will become apparent from consideration of the drawings and ensuing description of it.

DETAILED DESCRIPTION OF THE INVENTION

Figure 1:
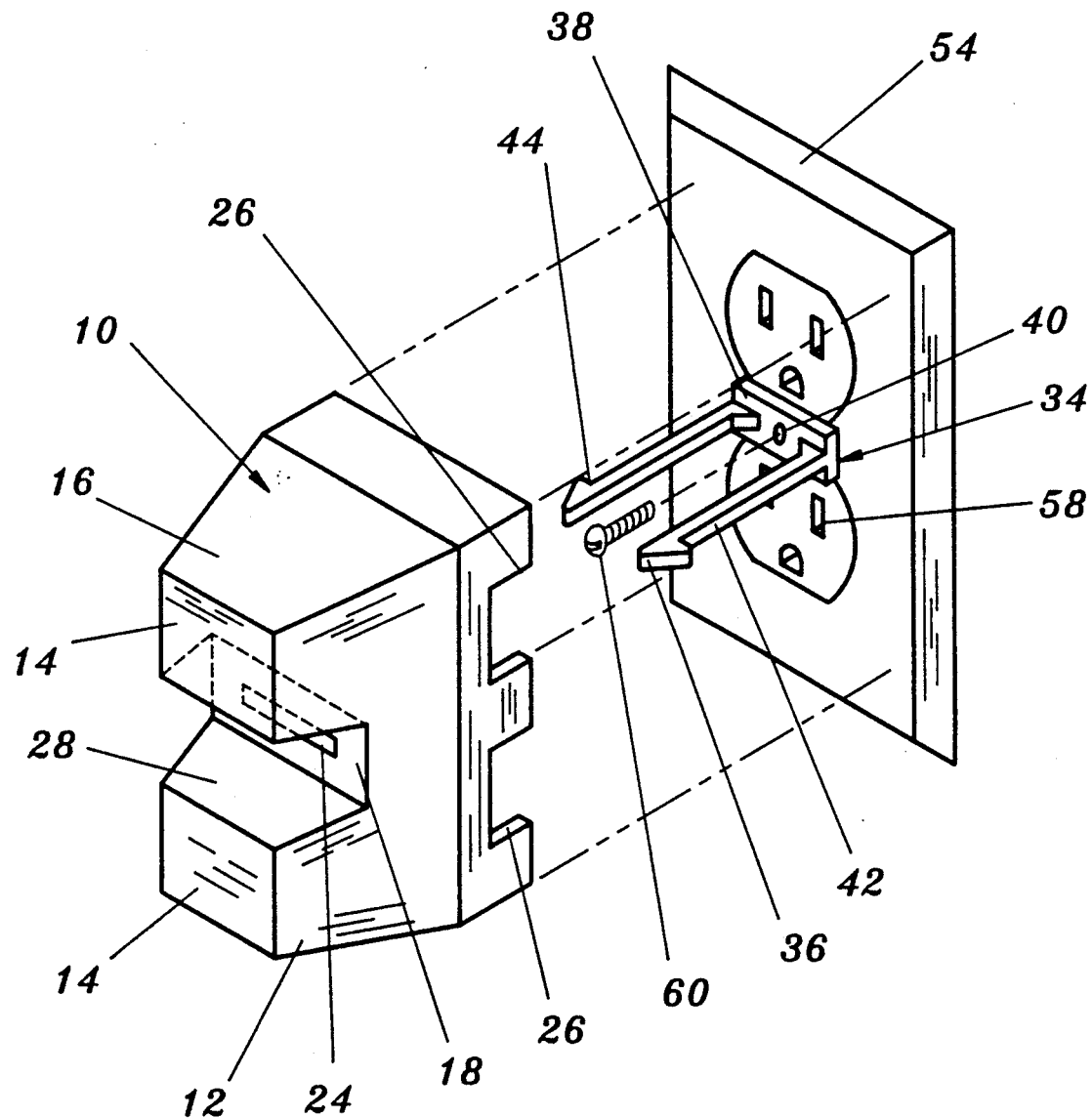
FIG. 1 is a perspective assembly view showing front of housing and flexible clip attached to electrical outlet faceplate.

The outlet safety cover includes a housing 10 and flexible clip 34 which interlocks with housing 10 to securely hold housing 10 against electrical outlet faceplate 54.

Referring to FIGS. 3-7, the housing 10 is of rectangular configuration and is symmetrical about axes 8 and 9 intersecting at center of clip mounting screw 60. Housing 10 is formed of two side walls 12 that are parallel to axis 9 and extend to end walls 16 which are parallel to axis 8. Each side wall 12 has two access cutouts 26 located close to intersection of end walls 16. Side walls 12 and end walls 16 extend at a slight angle to meet front walls 14 which are parallel to electrical outlet faceplate 54. Front walls 14 are spaced from electrical outlet faceplate 54 enough to allow plugs 56 to be enclosed by side walls 12, walls 16, and front walls 14. Retaining surface 18 is located between and parallel to end walls 16 and electrical faceplate 54. Extending from retaining surface 18 to end walls 16 are two retaining surface support walls 28. A clip shroud 20 is provided with a beveled entrance 22 and clip exit 24 and is attached to retaining surface 18 at clip exit 24.

Figure 4:
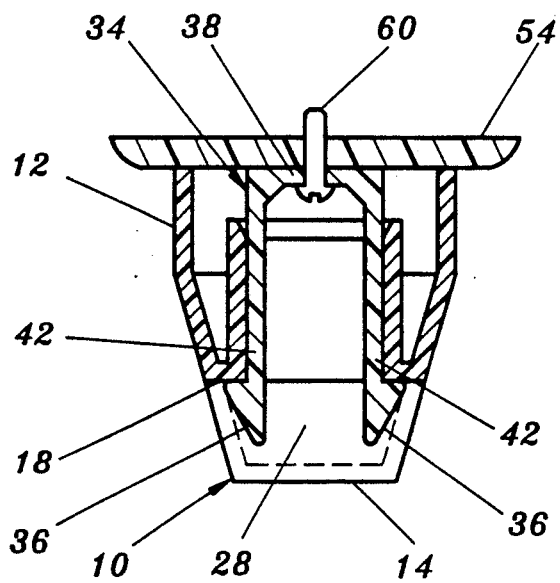
FIG. 4 is a top sectional view through the housing taken on line 4—4 of FIG. 3 and showing flexible clip in locked position.
Figure 5:
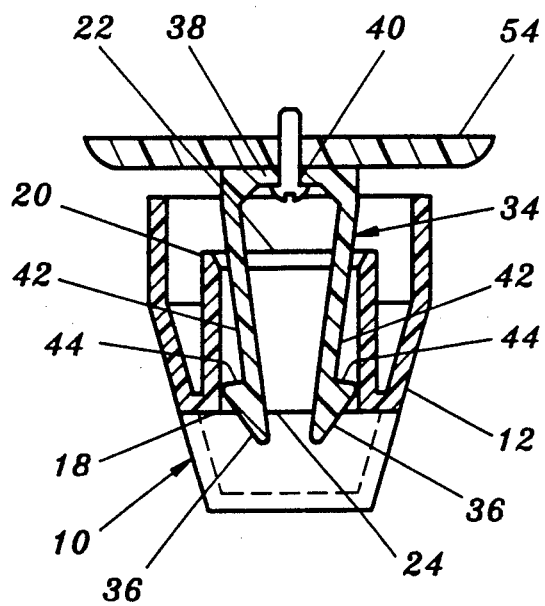
FIG. 5 is the same as FIG. 4 except flexible clip is shown in unlocked position.
Figure 3:
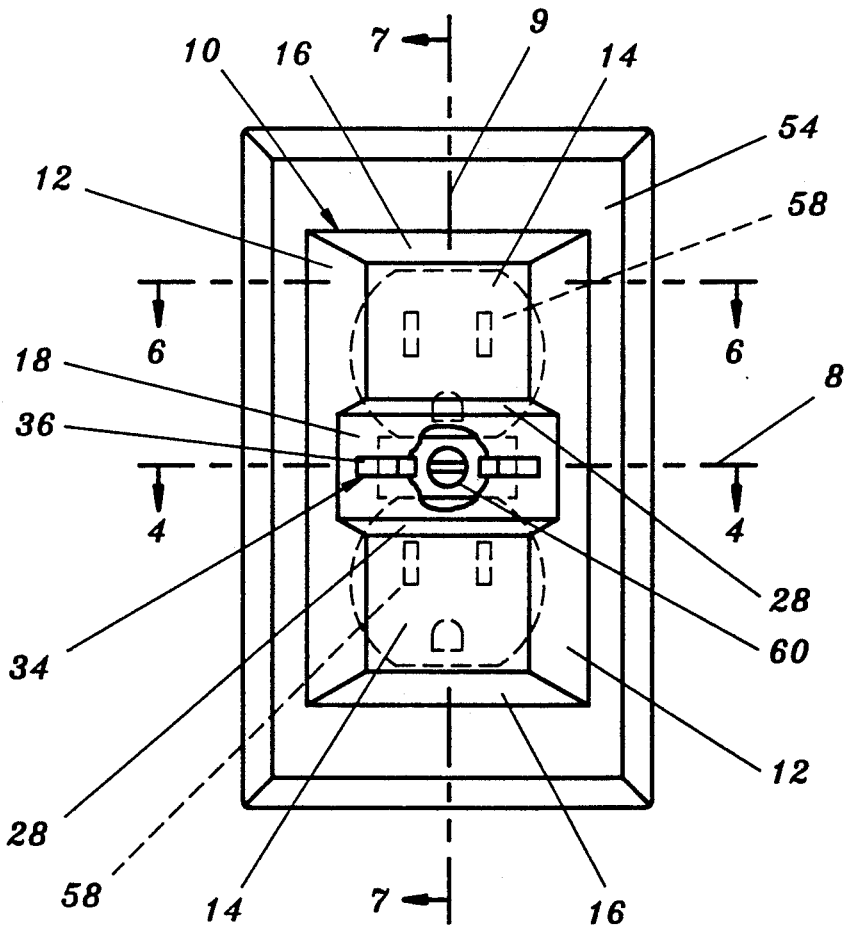
FIG. 3 is a front assembly view showing housing, flexible clip, clip mounting screw, and electrical outlet faceplate.
Figure 6:
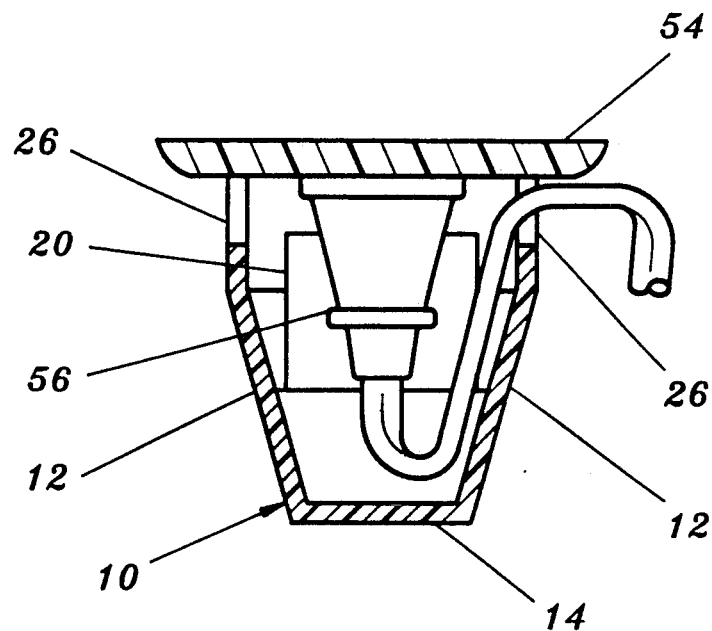
FIG. 6 is a top sectional view through the housing taken on line 6—6 of FIG. 3 and showing electrical plug enclosed by housing.
Figure 7:
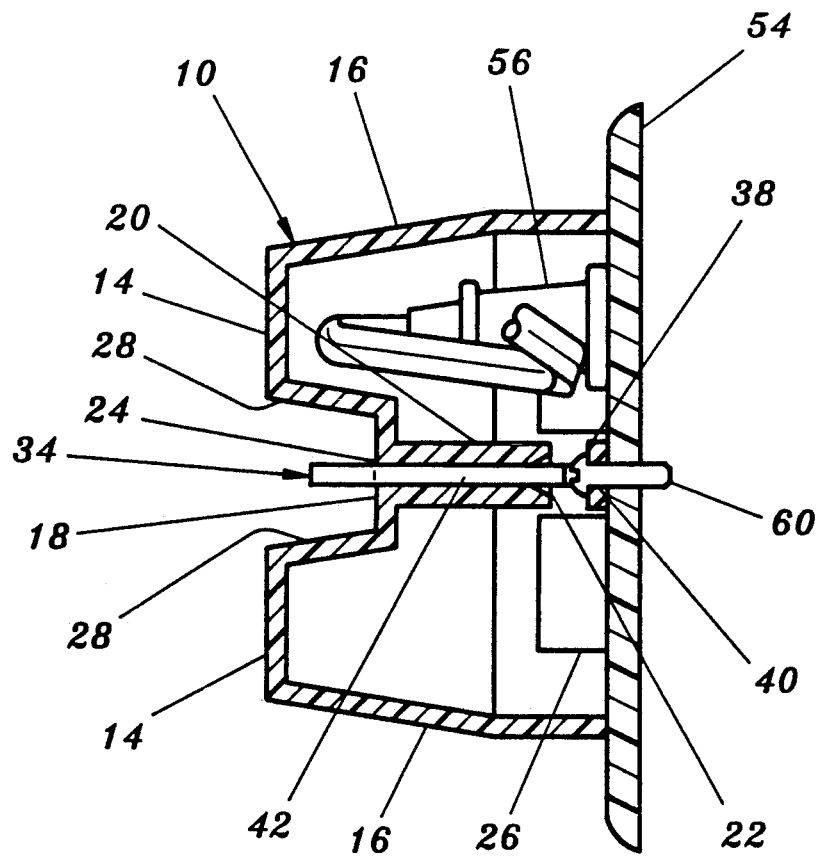
FIG. 7 is a side sectional view through the housing taken on line 7—7 of FIG. 3 and showing electrical plug enclosed by housing.

Referring to FIGS. 3-7, the flexible clip 34 is symmetrical about axes 8 and 9 intersecting at center of clip mounting screw 60. The clip 34 is formed from a rectangular base 38 that is dimensioned to fit between outer edges of the electrical sockets 58. Located at center of base 38 is a mounting hole 40 which extends through base 38. Each side of base 38 is provided with a shaft 42 which projects perpendicular to base 38. A tab 36 is located at the end of both shafts 42, each tab 36 is provided with a latching surface 44 that is parallel to base 38. Referring to FIGS. 4 and 5, shafts 42 are dimensioned to allow an inward flex under adult finger pressure. The shafts 42 shall flex enough to allow tabs 36 to pass through clip shroud 20. The shafts 42 and tabs 36 are of sufficient thickness to allow a slip fit through clip shroud 20.

The housing 10 and clip 34 are made from a resilient plastic material and formed by a conventional molding process. In order to reduce cost of housing 10 and clip 34, both elements are fabricated from the same mold.

Figure 2:
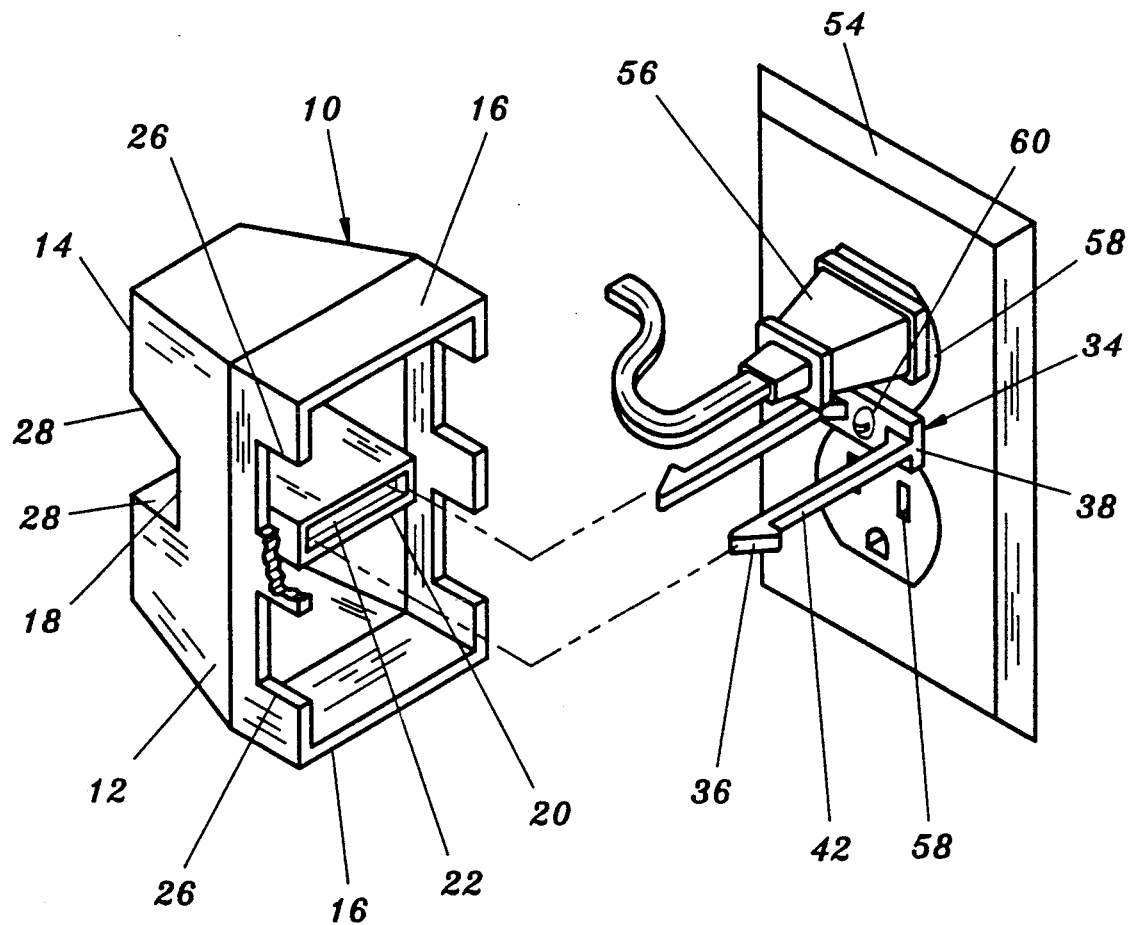
FIG. 2 is a perspective assembly view showing rear of housing and electrical plug connected to electical outlet.

In use (FIGS. 1 and 2), the existing screw that attaches electrical outlet faceplate 54 to outlet is removed, and base 38 of clip 34 is placed between electrical sockets 58. The clip mounting screw 60 is insert through mounting hole 40 and into threaded hole of outlet where existing screw was removed. Mounting screw 60 is tightened against faceplate 54 enough to prevent movement of clip 34. Prior to assembling housing 10 onto clip 34, the plugs 56 are inserted into sockets 58 and routed through access cutouts 26. As shown in FIG. 2 and FIG. 5, the housing 10 is assembled onto clip 34 by aligning beveled entrance 22 of shroud 20 with tabs 36, pushing housing 10 forward towards faceplate 54, the shafts 42 will flex inward and travel through shroud 20. When latching surface 44 of tabs 36 reach exit 24 the shafts 42 snap back to original position, thus interlocking housing 10 with clip 34, FIG. 4. To remove housing 10 from clip 34, finger pressure is applied to tabs 36 which disengages latching surface 44 from retaining surface 18. Accordingly, the reader will see that the outlet safety cover of this invention can be used to greatly reduce possibility of electrical shock to small children. The outlet safety cover of this invention can be used easily and conveniently; furthermore, the outlet safety cover has several advantages in that it fits over existing electrical outlet faceplate; therefore, keeping the user away from electrical connections of the outlet;

it permits electrical cord to exit cover on either side which eliminates awkward cord routing to the appliance used;

it provides a flexible clip to secure housing against outlet faceplate; consequently, allowing the user to install and remove housing quickly without the use of a tool; and it provides a recessed area on housing where clip interlocks with housing; therefore, preventing objects such as vacuums and toys from hitting and possibly disengaging clip from housing.

The above disclosure is intended to be illustrative and not to be read in the limiting sense. Numerous changes in design could be made without departing from the intent and scope of this invention.

I claim:

1. A safety cover for a household electrical outlet having a faceplate and a separated pair of sockets extending through said faceplate, said safety cover comprising:
   a) a housing dimensioned to enclose a plug end of two electrical cords when said plug ends are connected to said sockets, said plug ends configured with two prongs or three prongs;
   b) said housing having an open face, said open face is dimensioned to seat flush on the faceplate front surface;
   c) said housing having a plurality of access cutouts for routing said electrical cords from inside said housing to appliances;
   d) a clip having a base and a separated pair of latching elements extending from said base, said base is seatable against said faceplate front surface and between said separated sockets, said base having a hole dimensioned to accept a threaded fastener which secures said clip to the faceplate screw position;
   e) said housing having means to actuate said latching elements as said housing is pressed onto said latching elements, said latching elements having means to securely hold said housing against said faceplate front surface after said actuation, whereby said housing can be installed without using a tool;
   f) said latching elements being flexible under finger pressure as to release said housing from said latching elements, whereby said housing can be removed without using a tool.

2. The safety cover of claim 1 wherein said latching elements extend parallel to each other and perpendicular to said base.

3. The safety cover of claim 1 wherein said means to securely hold said housing against said faceplate comprises an outwardly protruding tab on an end of each said latching element.

4. The safety cover of claim 1 wherein said means to actuate said latching elements comprises a beveled cutout dimensioned to compress said latching elements as said housing is pressed onto the ends of said latching elements.

* * * * *